United States Patent
Huang (10) Patent No.: US 9,390,100 B2
(45) Date of Patent: *Jul. 12, 2016

(54) STORING DIFFERENCES BETWEEN PRECOMPRESSED AND RECOMPRESSED DATA FILES

(71) Applicant: EMC Corporation, Hopkinton, MA (US)

(72) Inventor: Mark Huang, Seattle, WA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/677,212

(22) Filed: Apr. 2, 2015

(65) Prior Publication Data

US 2015/0293934 A1    Oct. 15, 2015

Related U.S. Application Data

(63) Continuation of application No. 13/329,072, filed on Dec. 16, 2011, now Pat. No. 9,026,505.

(51) Int. Cl.
  *G06F 7/02*     (2006.01)
  *G06F 17/30*    (2006.01)

(52) U.S. Cl.
  CPC ...... *G06F 17/30153* (2013.01); *G06F 17/3015* (2013.01); *G06F 17/30106* (2013.01); *G06F 17/30156* (2013.01); *G06F 17/30162* (2013.01)

(58) Field of Classification Search
  CPC ............... G06F 17/30153; G06F 17/30162; G06F 17/3015; G06F 3/0641; G06F 17/30067
  See application file for complete search history.

(56) References Cited

U.S. PATENT DOCUMENTS

| | | | | |
|---|---|---|---|---|
| 5,574,906 A * | 11/1996 | Morris | ............... | G06F 11/1451 707/640 |
| 6,088,694 A * | 7/2000 | Burns | ............... | G06F 11/1451 |
| 6,766,334 B1 * | 7/2004 | Kaler | ............... | G06F 8/71 |
| 6,804,401 B2 * | 10/2004 | Nelson | ............... | G06T 9/00 341/51 |
| 2005/0219076 A1 * | 10/2005 | Harris | ............... | G06F 17/30067 341/51 |
| 2010/0119166 A1 * | 5/2010 | Puetter | ............... | 382/233 |
| 2011/0119240 A1 * | 5/2011 | Shapira | ............... | G06F 17/30067 707/693 |
| 2014/0052700 A1 * | 2/2014 | VanderSpek | ............... | G06F 17/30162 707/693 |

* cited by examiner

*Primary Examiner* — Bruce Moser
(74) *Attorney, Agent, or Firm* — Van Pelt, Yi & James LLP (57) ABSTRACT

A system comprises a processor and a memory. The processor is configured to decompress a precompressed file; recompress the decompressed file; and determine a difference file. The memory is coupled to the processor and configured to provide the processor with instructions.

21 Claims, 8 Drawing Sheets

STORING DIFFERENCES BETWEEN PRECOMPRESSED AND RECOMPRESSED DATA FILES

CROSS REFERENCE TO OTHER APPLICATIONS

This application is a continuation of U.S. patent application Ser. No. 13/329,072, now U.S. Pat. No. 9,026,505 B1, entitled STORING DIFFERENCES BETWEEN PRECOMPRESSED AND RECOMPRESSED DATA FILES filed Dec. 16, 2011 which is incorporated herein by reference for all purposes.

BACKGROUND OF THE INVENTION

As the computing power of modern devices grows, more and more data is generated. One approach that has been taken to address the increasing size of data files is including compression as part of a data format. Many common data file types now use compression, including JPEG, PDF, MP3, and Microsoft Office Open XML formats. This approach is advantageous for saving space on smaller computing systems; however, it may not be as advantageous for optimized enterprise storage systems. Some enterprise storage systems utilize deduplication to minimize file storage. Deduplicating systems recognize repeated chunks or segments of data and store only a single copy of each segment, greatly reducing storage when similar files are stored. However, deduplicating systems lose much of their efficiency when storing compressed files, as even small modifications to a file can cause its compressed version to be completely different so that although repeated data sections can be recognized in an uncompressed version of the data, they cannot be recognized in a compressed version.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Storing differences between precompressed and recompressed files is disclosed. A system comprises a processor and a memory. The processor is configured to decompress a precompressed file. The processor is further configured to recompress the decompressed file. The processor is further configured to determine a difference file. The memory is coupled to the processor and configured to provide the processor with instructions.

In some embodiments, some or all of a file's data is decompressed before storing the file in a deduplicating system. When the file is retrieved from storage, the file's data is recompressed and the file is restored to its original format. Despite the loss in local compression from decompressing the file's data, there can be an overall gain in global data compression due to deduplication of the segments used to store the file's data. However, there may be differences between the original precompressed file and the recompressed file if a different implementation of the compression algorithm is used to recompress it (e.g., the precompressed file and the recompressed file contain differences—bytes or sets of bytes are different at a set of locations between the two files). The data file retains its usability but can fail checksum tests intended to verify that the data has not been corrupted while it was stored. In some storage systems, these slight differences are not tolerable.

In various embodiments, the precompressed file comprises a file that contains some data that had been compressed, a complete file that had been compressed, or any other portion of a file had been compressed. For example, the whole precompressed file is not compressed. In some embodiments, the compression algorithms used for compressing the precompressed file and the recompressed file are likely to be the same. For example, the implementation of the compression algorithm, or a runtime option, is/are different.

In some embodiments, data storage systems that store data from precompressed formats according to their decompressed structure (e.g., deduplicating data storage systems), differences in the file that arise from decompressing the data, storing it, and recompressing it are not acceptable. A system that eliminates these differences by storing differences between precompressed and recompressed data files first decompresses the data file, then immediately recompresses it and measures the differences between the precompressed data file and the recompressed data file. The differences are stored in a difference file that allows the system to use the file to transform the recompressed data file into the precompressed data file by undoing each difference. In various embodiments, the differences are stored as metadata or in any other appropriate format. The difference file is stored in the data storage system along with the uncompressed file, and the recompressed data file used to create the difference file is discarded. When it is desired to retrieve the data file from the data storage, the uncompressed file and the difference file are retrieved, and the uncompressed file is recompressed. Differences between the recompressed file and the original precompressed file are then undone using the difference file, returning the file to its precise original state. In some embodiments, even though the recompression process is deterministic, a checksum over the original precompressed file is stored and verified to be the same as the checksum over the recompressed file, before returning the file.

This technique is only practical when the difference between the precompressed and recompressed file is very small, e.g., when the compression algorithms used for pre-compression and recompression are very similar. In order to verify that this is the case, the system can check the size of the difference file before storing data. If the difference file is very small (e.g., below a threshold), the technique is operating properly, and the difference file and the uncompressed file are stored. If the difference file is large (e.g., above a threshold), the technique is not operating properly, and the precompressed file is stored without further processing. To help ensure that the compression algorithms used for precompression and recompression are very similar, the system can be tuned by decompressing and recompressing a test file using several different recompression algorithms, and generating difference files between the precompressed and recompressed file for each compression algorithm. In some embodiments, other tradeoffs such as a processing time (e.g., efficient computing of compression) are considered, for example, some compressors are very slow when presented with particular types of data. The algorithms are compared by comparing the size of the difference files: the smallest difference file corresponds to the selected compression algorithm to use for that file type. This test may be performed for each different file type the compression algorithm is to be optimized for, as each file type may use its own different precompression algorithm.

Figure 1:
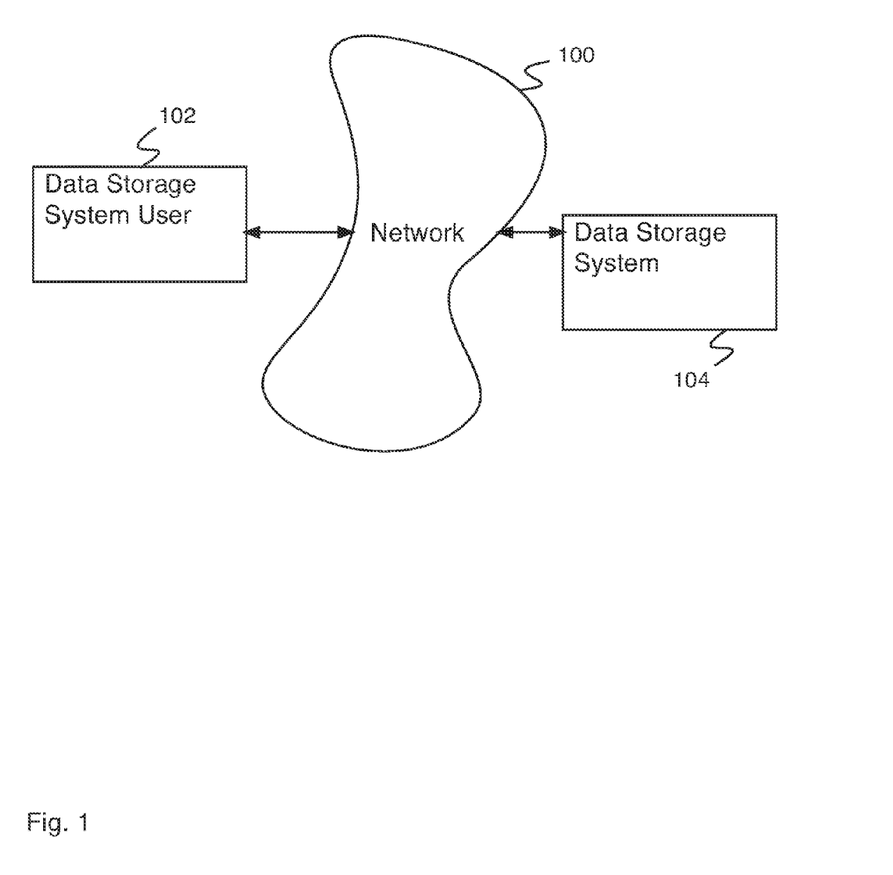
FIG. 1 is a block diagram illustrating an embodiment of a network system.

FIG. 1 is a block diagram illustrating an embodiment of a network system. In the example shown, the network system comprises data storage system user 102 and data storage system 104 communicating via network 100. In various embodiments, network 100 comprises one or more of the following: a local area network, a wide area network, a wired network, a wireless network, the Internet, or any other appropriate network. Data storage system 104 comprises a data storage system for storage and retrieval of information. In some embodiments, data storage system 104 comprises a distributed data storage system, e.g., a data storage system comprising multiple computers not necessarily in the same location. In some embodiments, data storage system 104 comprises a system for processing information. In some embodiments, data storage system 104 comprises a storage system optimized to efficiently store uncompressed files. Data storage system user 102 comprises a data storage system user accessing data storage services on data storage system 104. In some embodiments, data storage system user 102 comprises an employee at a company utilizing a data storage system. In some embodiments, data storage user 102 comprises an employee at a company purchasing data storage system services. In various embodiments, there are 1, 2, 4, 13, 22, 115, or any other appropriate number of database system users accessing data storage services on data storage system 104. In some embodiments, each data storage system user only has access to their own data stored on data storage system 104 and is able to utilize data storage system 104 as though they are the sole data storage system user. In some embodiments, data storage system 104 comprises a system for storing differences between precompressed and recompressed data files.

Figure 2:
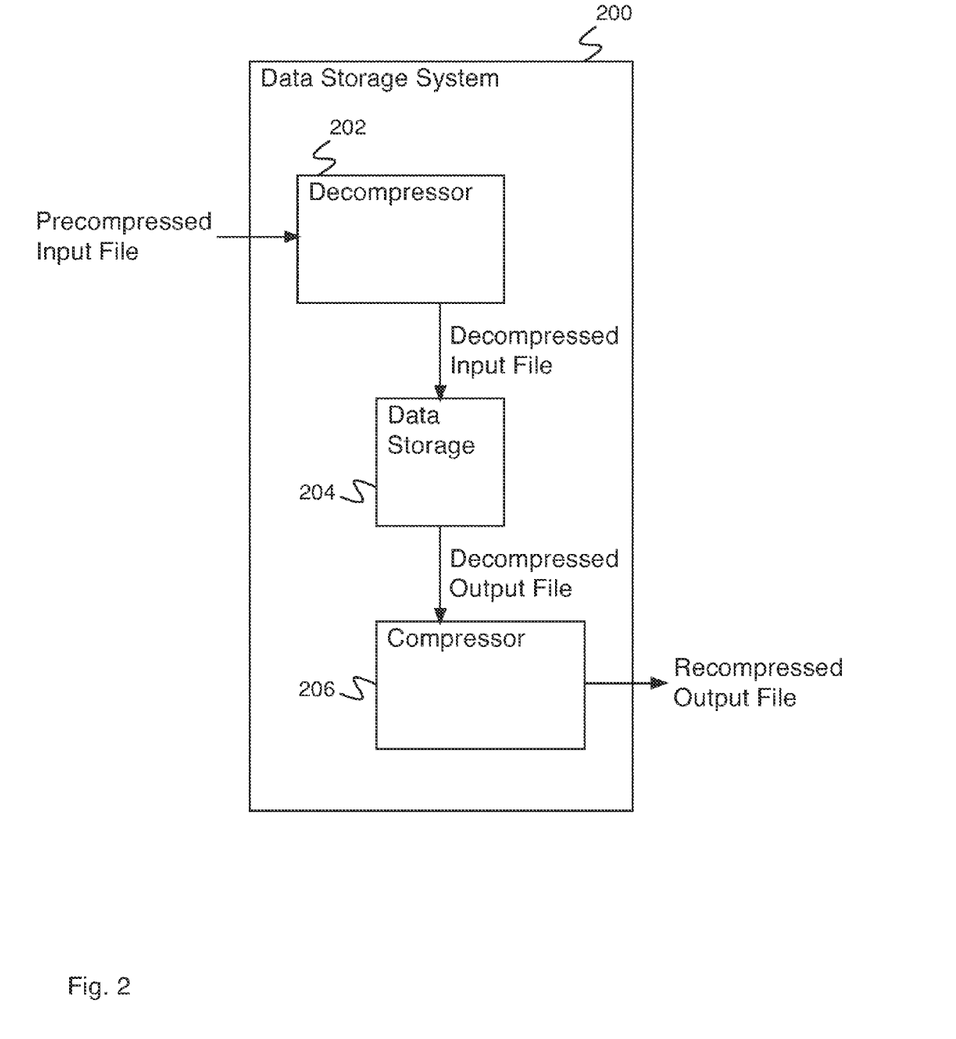
FIG. 2 is a block diagram illustrating an embodiment of a system for storage and retrieval of precompressed data.

FIG. 2 is a block diagram illustrating an embodiment of a system for storage and retrieval of precompressed data. In some embodiments, data storage system 200 of FIG. 2 comprises data storage system 104 of FIG. 1. In the example shown, data storage 204 is optimized to efficiently store uncompressed files. A precompressed input file received by data storage system 200 (e.g., from a data storage system user such as data storage system user 102 of FIG. 1) is received by decompressor 202. The basic compression algorithm used to compress the precompressed input file (e.g., zip) is known to the creator of data storage system 200, but details of the compression algorithm (e.g., implementation details, compression quality details, etc.) are not known. Decompressor 202 decompresses the precompressed input file and sends the decompressed input file to data storage 204. Data storage 204 stores the decompressed input file. When the file is to be retrieved from data storage system 200, data storage 204 sends the decompressed output file to compressor 206. Compressor 206 compresses the decompressed output file and outputs the recompressed output file (e.g., to a data storage system user such as data storage system user 102 of FIG. 1). In some embodiments, if the compression algorithm used by compressor 206 is different from the compression algorithm used in creation of the precompressed input file, the recompressed output file will differ from the precompressed input file.

Figure 3:
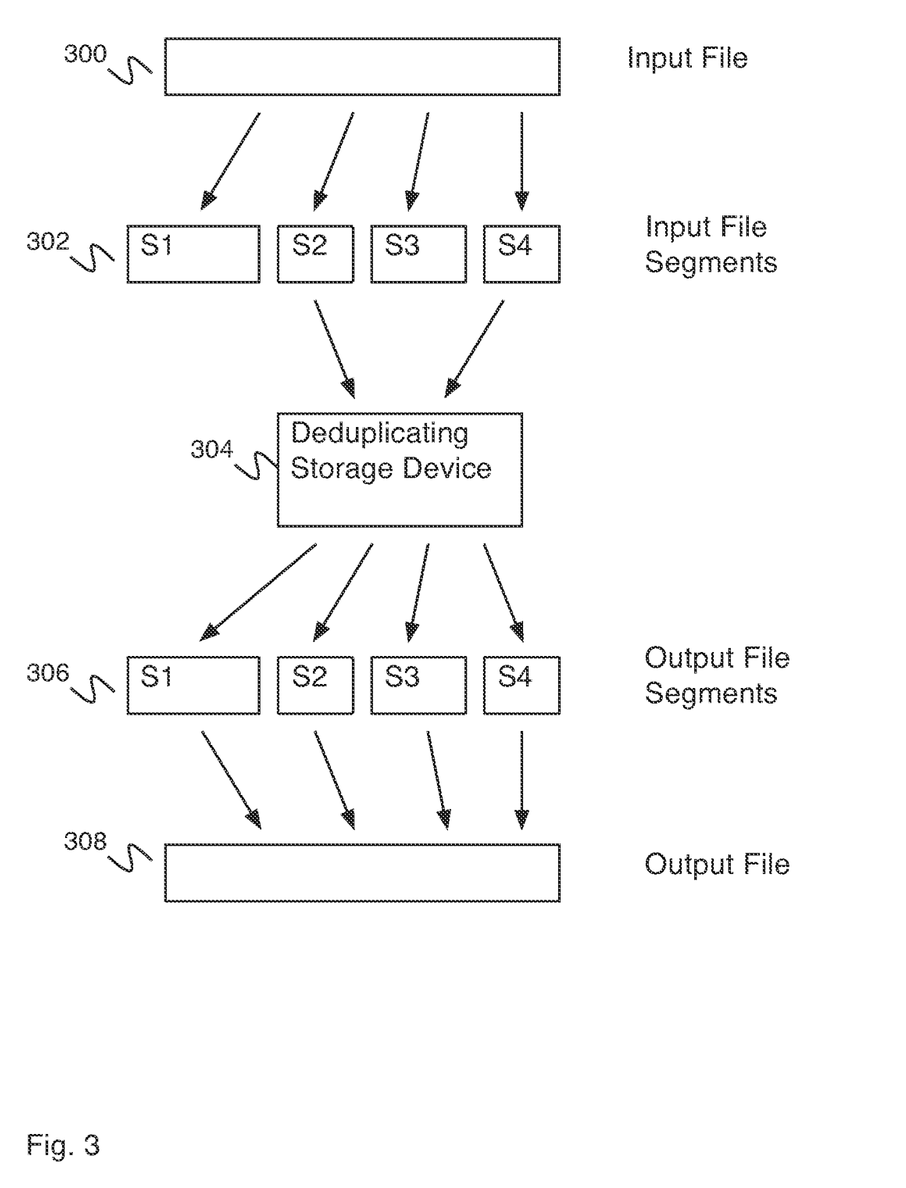
FIG. 3 is a block diagram illustrating an embodiment of data storage and retrieval using a deduplicating data storage system.

FIG. 3 is a block diagram illustrating an embodiment of data storage and retrieval using a deduplicating data storage system. In some embodiments, data storage 204 of FIG. 2 comprises a deduplicating data storage system. In the example shown, input file 300 comprises an input file received by the deduplicating storage system. The deduplicating data storage system breaks input file 300 into input file segments 302. In some embodiments, an input file is broken into segments of a predetermined size. In some embodiments, the file is broken into segments of varying sizes. In some embodiments, an input file is broken into segments by applying a function to the input file and breaking it wherever the function reaches a predetermined value or exhibits a predetermined behavior (e.g., a maximum, a minimum, an inflection point, etc.). In various embodiments, the segment must also have a length greater than a minimum length and/or less than a maximum length. Any input file segments determined to not already be stored in the deduplicating storage device are then stored. A list of segments required to store and/or reconstruct the input file is stored associated with other meta information about the file (e.g., file name, creation date, modify date, etc.). In some embodiments, a stream of data or block of data is stored and a file index is also stored for the stream or block. In the example shown, segments S2 and S4 of input file segments 302 are determined to not already be stored in deduplicating storage device 304, so they are stored. Segments 51 and S3 are determined to already be stored in deduplicating storage device 304, so they are not stored again. When the file is to be retrieved from the deduplicating data storage system, output file segments 306 are retrieved from deduplicating storage device 304. Output file segments 306 correspond to input file segments 302. Output file segments 306 are then assembled into output file 308.

Figure 4:
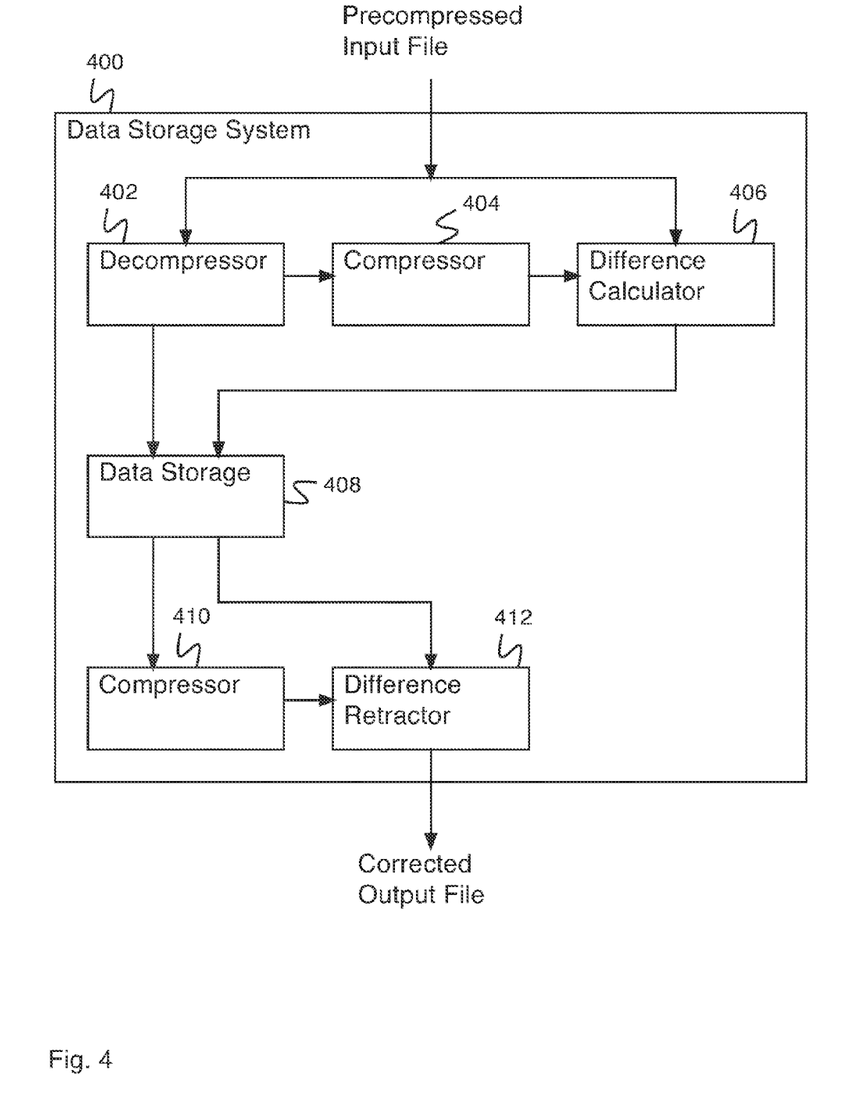
FIG. 4 is a block diagram illustrating an embodiment of a system for storage and retrieval of precompressed data.

FIG. 4 is a block diagram illustrating an embodiment of a system for storage and retrieval of precompressed data. In some embodiments, data storage system 400 comprises a system for storing differences between precompressed and recompressed data files. In some embodiments, data storage system 400 comprises data storage system 104 of FIG. 1. In some embodiments, the system of FIG. 4 comprises a processor configured to decompress a precompressed file, recompress the decompressed file, and determine a difference file; and a memory coupled to the processor and configured to provide the processor with instructions.

In the example shown, data storage 408 is optimized to efficiently store uncompressed files. In some embodiments, data storage 408 comprises a deduplicating storage system. A precompressed input file received by data storage system 400 (e.g., from a data storage system user such as data storage system user 102 of FIG. 1) is received by decompressor 402 and difference calculator 406. Decompressor 402 decompresses the input file and sends the decompressed input file to compressor 404 and data storage 408. Compressor 404 recompresses the decompressed input file and sends the recompressed input file to difference calculator 406. Difference calculator 406 calculates the difference between the precompressed input file and the recompressed input file, and creates a difference file representing the difference between the precompressed input file and the recompressed input file. Difference calculator 406 then sends the difference file to data storage 408. Data storage 408 receives and stores the decompressed input file and the difference file. In some embodiments, the decompressed input file is stored as a set of segments. In some embodiments, the set of segments and the difference file are used to reconstruct the precompressed file. In some embodiments, meta information is stored associated with the set of segments, or sub-set of newly stored segments, enabling reconstruction of a file from the stored set of segments.

When the file is to be retrieved from data storage system 400, data storage 408 sends the decompressed output file to compressor 410 and the difference file to difference retractor 412. In some embodiments, data storage 408 reconstructs the decompressed file from the set of segments and then sends the decompressed file to compressor 410. Compressor 410 recompresses the decompressed output file and sends the recompressed output file to difference retractor 412. In some embodiments, compressor 410 is identical to compressor 404. Difference retractor 412 uses the difference file to retract differences from the recompressed output file, producing a corrected output file that is identical to the precompressed input file initially received. Difference refractor 412 then outputs the corrected output file (e.g., to a data storage system user such as data storage system user 102 of FIG. 1).

Figure 5:
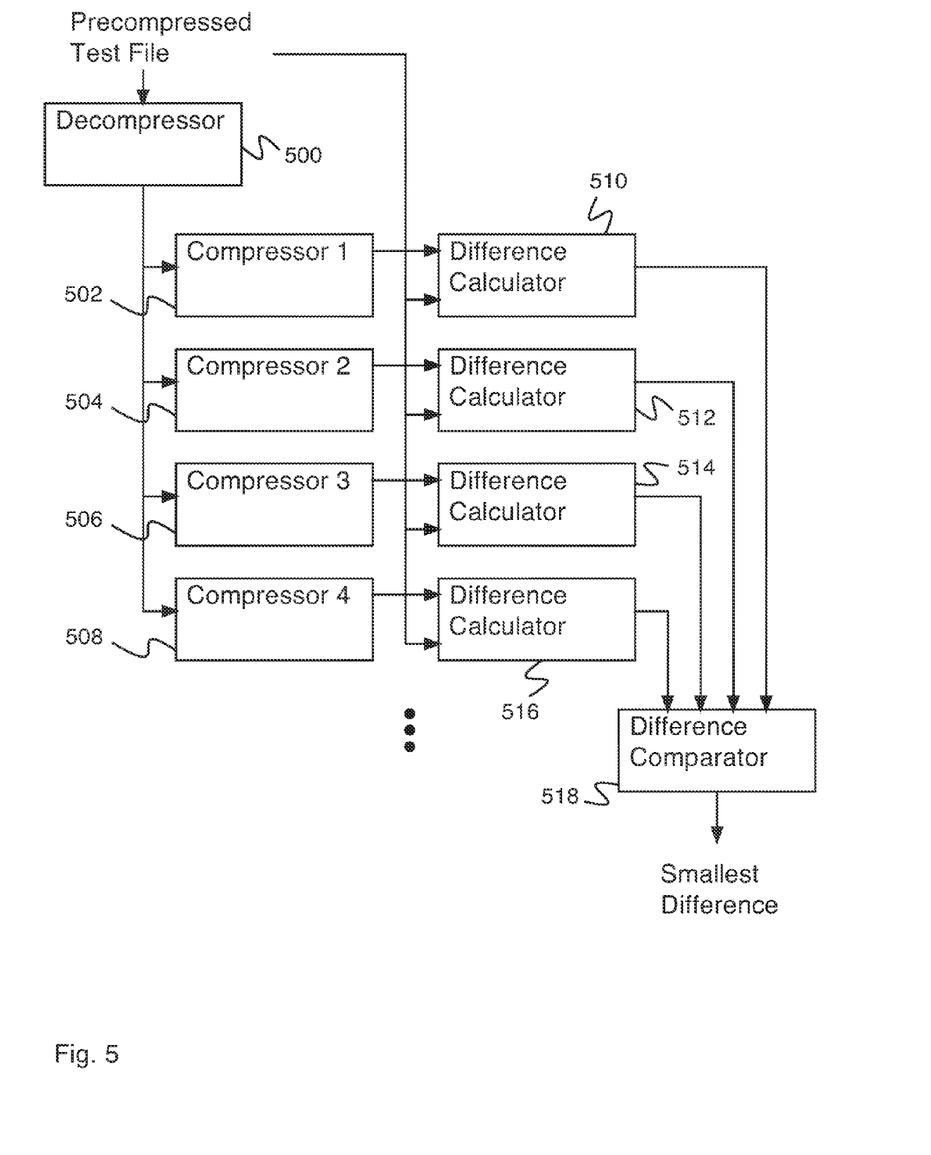
FIG. 5 is a block diagram illustrating an embodiment of a system for determining a selected compression algorithm.

FIG. 5 is a block diagram illustrating an embodiment of a system for determining a selected compression algorithm. In some embodiments, the system of FIG. 5 determines the selected compression algorithm for use by compressor 404 of FIG. 4 or compressor 410 of FIG. 4. In some embodiments, the system of FIG. 5 determines the selected compression algorithm for use by a system for storing differences between precompressed and recompressed data files. In some embodiments, the system of FIG. 5 determines the selected compression algorithm for recompressing files of a single file type (e.g., PDF, JPG, MP3, Microsoft Office Open XML, etc.). In some embodiments, the selected compression algorithm determined by the system of FIG. 5 comprises one of a set of compression algorithms that leads to a relatively small difference between a precompressed file and a recompressed file. The system of FIG. 5 comprises decompressor 500, pairs of compressors and difference calculators, and difference comparator 518. In the example shown, the system of FIG. 5 comprises four pairs of compressors and difference calculators (e.g., compressor 502 and difference calculator 510, compressor 504 and difference calculator 512, compressor 506 and difference calculator 514, and compressor 508 and difference calculator 516). In various embodiments, there are 2, 3, 4, 10, 21, or any other appropriate number of pairs of compressors and difference calculators. Each compressor is configured to use a slightly different algorithm. The system of FIG. 5 receives a precompressed test file of the file type the system is being used to determine the selected compression algorithm for. In some embodiments, the precompressed test file is designed to respond strongly to changes in recompression algorithm, e.g., create a very different recompressed file if the recompression algorithm is different from the precompression algorithm. In some embodiments, the precompressed file is an arbitrary file of the desired file type. The precompressed test file is received by decompressor 500 as well as by each of the difference calculators. Decompressor 500 decompresses the precompressed test file and delivers the decompressed test file to each of the compressors. Each compressor recompresses the test file and delivers the recompressed test file to its paired difference calculator. Each compressor is configured to use a slightly different algorithm, so each recompressed file may be slightly different. In some embodiments, a compressor uses the same algorithm as another compressor but with different operational parameters (e.g., a seed, etc.). Each difference calculator calculates the differences between the recompressed test file it received and the precompressed test file, and delivers a difference file comprising the differences to difference comparator 518. Difference comparator 518 receives a difference file from each difference calculator and determines which difference file is the smallest. The compression algorithm that led to the smallest difference is determined to be the selected compression algorithm.

In various embodiments, compressor information or algorithm parameter information is stored with a file to enable recompression, or any other appropriate information is stored to enable reconstruction of the file or checking of the file (e.g., a checksum).

Figure 6:
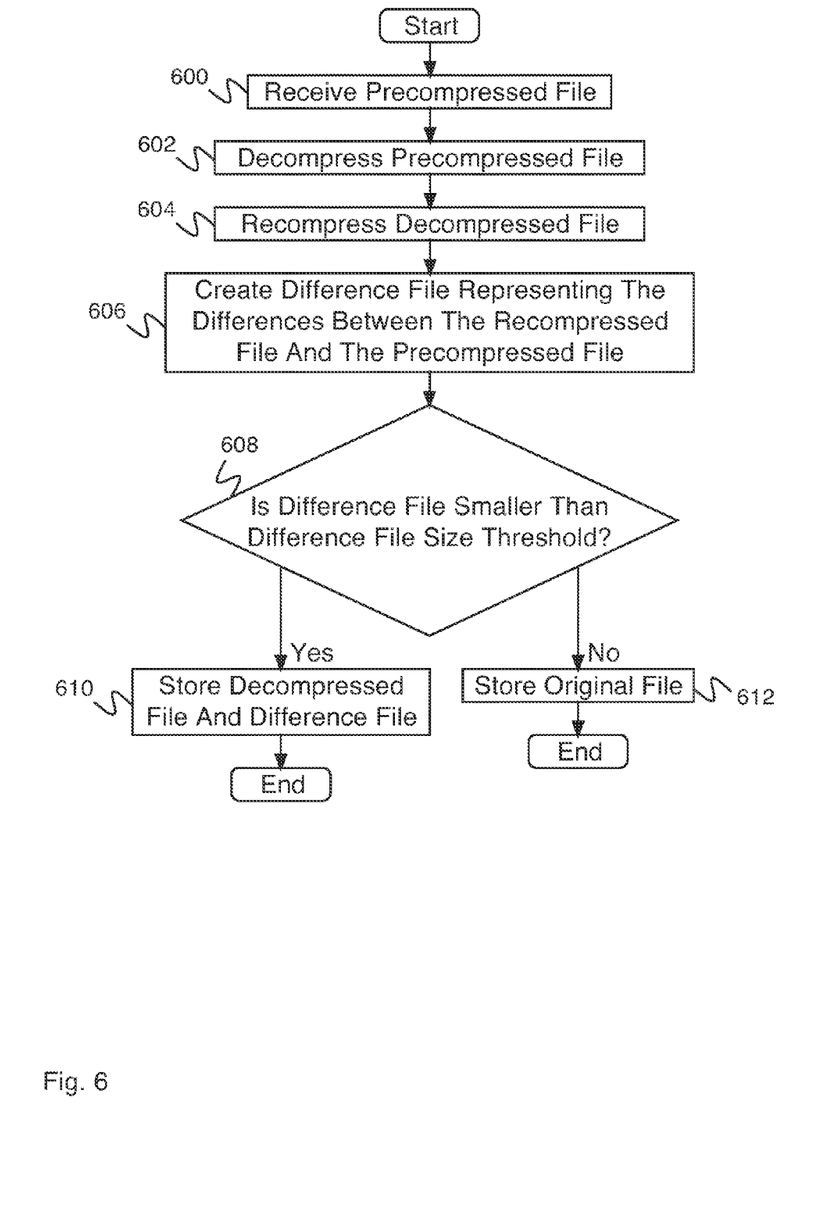
FIG. 6 is a flow diagram illustrating an embodiment of a process for storing a file.

FIG. 6 is a flow diagram illustrating an embodiment of a process for storing a file. In some embodiments, the process of FIG. 6 comprises storing differences between precompressed and recompressed data files. In some embodiments, the process of FIG. 6 is conducted by data storage system 400 of FIG. 4. In some embodiments, the process of FIG. 6 is used to store a precompressed file in a data storage device optimized to efficiently store uncompressed files. In some embodiments, the process of FIG. 6 is used to store a precompressed file in a deduplicating data storage device. In the example shown, in 600, a precompressed file is received. In some embodiments, the precompressed file is received from a user (e.g., data storage system user 102 of FIG. 1). In various embodiments, the precompressed file is a PDF file, a JPG file, an MP3 file, a Microsoft Office Open XML file, or any other appropriate type of precompressed file. In various embodiments, the file is compressed with zip, gzip, PKZIP, bzip2, lzip, or any other appropriate compression format. In some embodiments, it is determined whether a received file is a precompressed file. In various embodiments, determining whether a file is a precompressed file comprises matching the file with a file suffix, file type, associated program, content signature, or any other appropriate matching criteria and checking a database that associates a matching criteria and a compression method (e.g., a compression algorithm and parameter set, etc.) of the file. In some embodiments, a checksum over the precompressed file is calculated and stored to facilitate verification of recompression and reconstruction.

In 602, the precompressed file is decompressed (e.g., by a decompressor such as decompressor 402 of FIG. 4). In 604, the decompressed file is recompressed (e.g., by a compressor such as compressor 404 of FIG. 4). The recompressed file is a temporary file created to simulate recompression of the decompressed file after it is stored and later extracted and recompressed. The algorithm used to recompress the decompressed file is the same one that is used to recompress the decompressed file after it is stored and later extracted. Differences between the original precompressed file and the eventual recompressed file can be measured by comparing the original precompressed file with the recompressed file created in 604. In 606, a difference file representing the differences between the recompressed file and the precompressed file is created. In various embodiments, the difference file is created using diff, bdiff, a deduplicating data storage system differential calculator, a longest substring search algorithm, or any other appropriate difference file creator. In 608, it is determined whether the difference file is smaller than a difference file size threshold. In various embodiments, the difference file size threshold is 128 bytes, 1024 bytes, 100 kbytes, or any other appropriate file size threshold. If it is determined that the difference file is smaller than the difference file size threshold, control passes to 610. In 610, the decompressed file (e.g., the decompressed file created in 602) and the difference file are stored, and the process ends. In some embodiments, the decompressed file is stored as a set of segments and the difference file is stored as one or more segments. In some embodiments, meta information is stored enabling the reconstruction of the original file including recompression (e.g., compression type and parameters) and removal of the differences (e.g., difference file segment(s)). If it is determined in 608 that the difference file is not smaller than the difference file size threshold, control passes to 612. In some embodiments, the difference file larger than the difference file size threshold indicates that storing differences between precompressed and recompressed data files is not an appropriate technique for the precompressed file received in 600. In some embodiments, a recompression time is used to determine whether to store an original file or to store a decompress file and a difference file. In 612, the original file (e.g., the precompressed file received in 600) is stored. In some embodiments, the original file is stored as a set of segments. In some embodiments, meta information is stored enabling the reconstruction of the original file using the set of stored segments.

Figure 7:
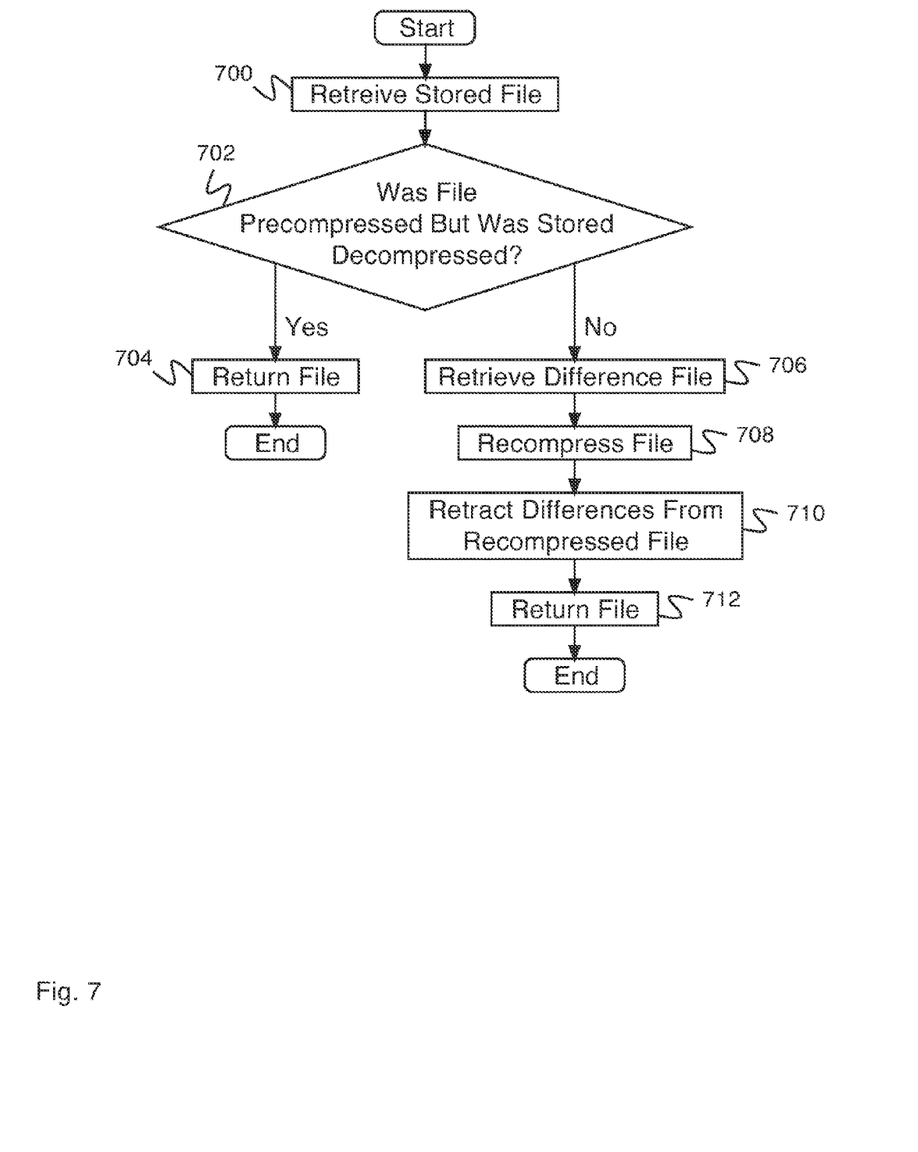
FIG. 7 is a flow diagram illustrating an embodiment of a process for retrieving a file from storage.

FIG. 7 is a flow diagram illustrating an embodiment of a process for retrieving a file from storage. In some embodiments, the process of FIG. 7 is used to retrieve stored differences between precompressed and recompressed data files. In some embodiments, the process of FIG. 7 is conducted by data storage system 400 of FIG. 4. In some embodiments, the process of FIG. 7 is used to retrieve a precompressed file from a data storage device optimized to efficiently store uncompressed files. In some embodiments, the process of FIG. 7 is used to retrieve a precompressed file from a deduplicating data storage device. In the example shown, in 700, a stored file is retrieved. In some embodiments, the stored file is retrieved from data storage (e.g., data storage 408 of FIG. 4, a memory, a hard drive, a RAID drive, a deduplicating storage system, etc.). In 702, it is determined whether the file was originally precompressed but was stored decompressed. For example, meta information associated with the file is retrieved indicating original compression type and compression parameters, if any, and one or more segments storing difference information. If the file was not modified from its original form, control passes to 704. In 704, the file is returned by the data storage system. In some embodiments, the file is returned to a user (e.g., data storage system user 102 of FIG. 1). No further processing on it is needed. If it was determined in 702 that the file was originally precompressed but was stored decompressed, control passes to 706. In 706, a difference file is retrieved. In some embodiments, the difference file is retrieved from the same data storage as the file retrieved in 700. In some embodiments, the difference file is stored as part of the file retrieved in 700, and it is removed from the file as part of retrieving it. In 708, the file is recompressed (e.g., by compressor 410 of FIG. 4). In 710, differences are retracted from the recompressed file (e.g., the file retrieved in 700). In some embodiments, differences are retracted using a difference file (e.g., the difference file retrieved in 706). In some embodiments, differences are retracted using a difference file retraction application (e.g., patch). In 712, the file is returned. In some embodiments, the file is returned to a user (e.g., data storage system user 102 of FIG. 1).

Figure 8:
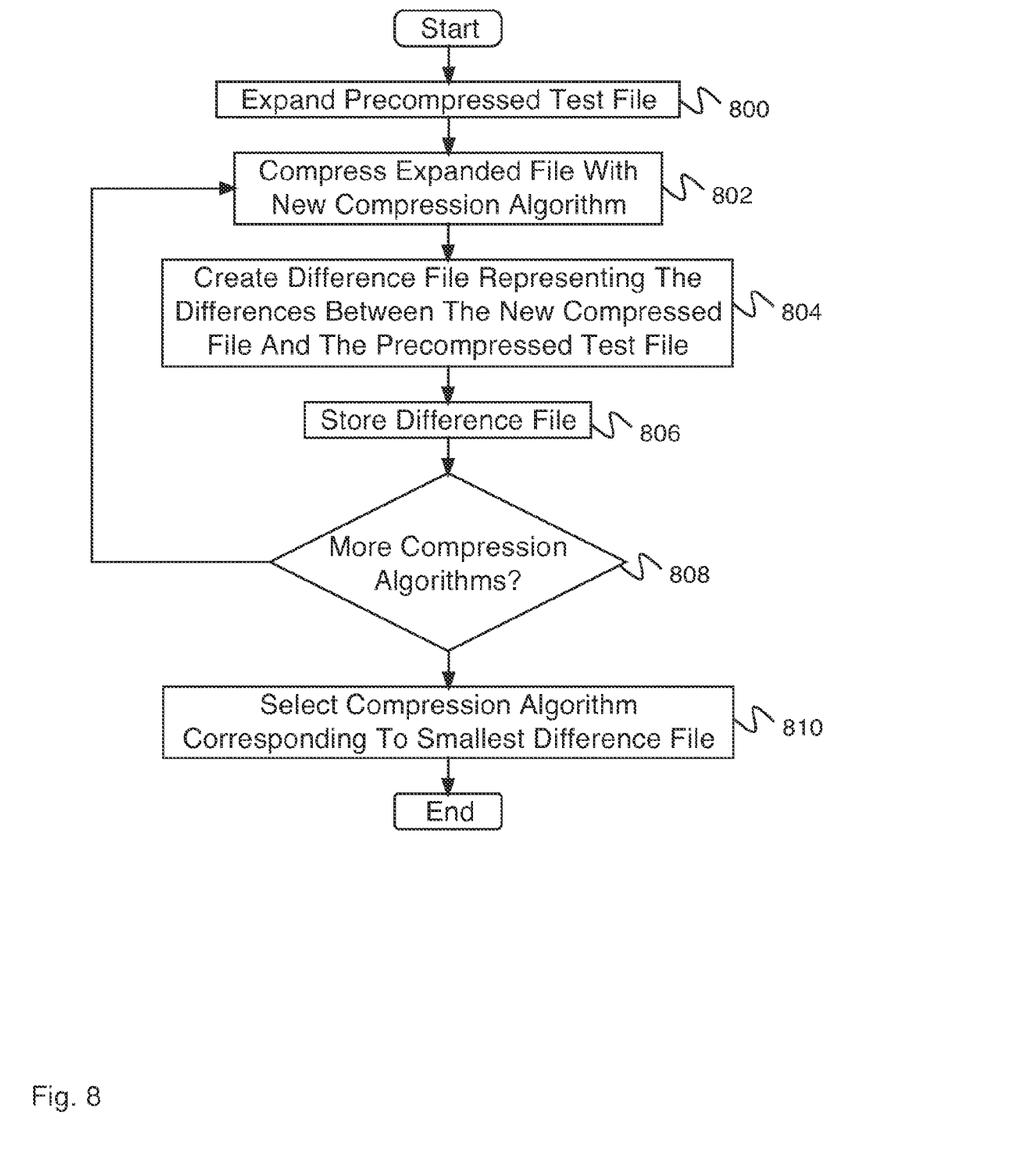
FIG. 8 is a flow diagram illustrating an embodiment of a process for determining a selected compression algorithm.

FIG. 8 is a flow diagram illustrating an embodiment of a process for determining a selected compression algorithm. In some embodiments, the process of FIG. 8 is carried out by the system of FIG. 5. In some embodiments, the selected compression algorithm determined by the process of FIG. 8 comprises one of a set of compression algorithms that leads to a relatively small difference between a precompressed file and a recompressed file. In the example shown, in 800, a precompressed test file is expanded. In 802, the expanded file is compressed with a new compression algorithm. In some embodiments, the file is compressed with a compression algorithm chosen from a list of compression algorithms to test. In some embodiments, the file is compressed with a compression algorithm with compression options chosen from a list of compression options to test. In 804, a difference file is created representing the difference between the new compressed file (e.g., the compressed file created in 802) and the precompressed test file. In 806, the difference file is stored. In 808, it is determined whether there are more compression algorithms to test. In some embodiments, determining whether there are more compression algorithms to test includes determining whether there are more parameter options to test associated with a given compression type. If there are more compression algorithms to test, control passes to 802. If there are not more compression algorithms to test, control passes to 810. In 810, the compression algorithm corresponding to the smallest difference file is selected. In some embodiments, selecting the compression algorithm corresponding to the smallest difference file comprises selecting the smallest difference file of the difference files stored (e.g., difference files stored in 806) and then selecting the compression algorithm corresponding to the smallest difference file (e.g., the compression algorithm used in 802 to produce the compressed file that, when compared with the precompressed test file in 804, produced the difference file determined to be the smallest difference file). The compression algorithm corresponding to the smallest difference file is then used by a compressor (e.g., compressor 404 of FIG. 4, compressor 410 of FIG. 4) for recompressing a precompressed file of the same type as the precompressed test file, in a system for storage and retrieval of precompressed data (e.g., the system for storage and retrieval of precompressed data of FIG. 4). In some embodiments, compression throughput is used to determine compression algorithm selection either alone or in combination with other factors (e.g., smallest difference file). In some embodiments, the process of FIG. 8 is repeated for multiple different precompressed test files, in order to determine the selected algorithm over a variety of test data.

In some embodiments, a selected compression algorithm comprises a given compression algorithm with a specific set of parameters (e.g., a seed, a compression strength, etc.). In some embodiments, the comparison between algorithms is between the same algorithm with different parameter settings. In some embodiments, the selection of a compression algorithm is based on the precompressed file desired to be stored. In various embodiments, the compression algorithm is selected based at least in part on difference file size, compression time, compression run time memory usage, hardware accelerator availability, compression processor utilization, or any other appropriate selection criteria.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for storing precompressed files, comprising:
a processor configured to:
retrieve a precompressed file stored as a set of segments and a difference file, wherein the difference file comprises one or more differences between the precompressed file and a recompressed input file obtained by compressing a decompressed version of the precompressed file, wherein a set of precompression compression parameters is different from a set of recompression compression parameters, wherein the precompressed file stored as the set of segments is stored using the decompressed version of the precompressed file;
reconstruct the precompressed file stored as the set of segments;
recompress the reconstructed file into a current recompressed file;
undo the one or more differences in the current recompressed file as indicated by the difference file; and
a memory coupled to the processor and configured to provide the processor with instructions.

2. A system as in claim 1, wherein the processor is further configured to: receive an input precompressed file to store and decompress the input precompressed file; and store the decompressed file as a set of segments.

3. A system as in claim 2, wherein the processor is further configured to recompress the decompressed file.

4. A system as in claim 3, wherein the processor is further configured to determine a first difference file.

5. A system as in claim 4, wherein the processor is further configured to store the first difference file with the decompressed file stored as a set of segments.

6. A system as in claim 1 wherein the difference file is also stored as one or more segments.

7. A system as in claim 1, wherein the precompressed file stored as a set of segments is stored in a deduplicating storage system.

8. A system as in claim 1, wherein the difference file was determined using a selected compression algorithm.

9. A system as in claim 8, wherein the selected compression algorithm comprises one of a set of compression algorithms using different compression parameters that creates a smallest difference file.

10. A system as in claim 8, wherein the processor is further configured to determine whether the difference file determined using the selected compression algorithm is larger than a predetermined threshold.

11. A system as in claim 10, wherein the processor is further configured to store the precompressed file in the event that the difference file is determined to be larger than the predetermined threshold.

12. A system as in claim 11, wherein the precompressed file is stored as a set of segments.

13. A system as in claim 12, wherein the processor is further configured to store the difference file.

14. A system as in claim 10, wherein the processor is further configured to store the decompressed file in the event that the difference file is determined to be not larger than the predetermined threshold.

15. A system as in claim 14, wherein the decompressed file is stored as a set of segments.

16. A system as in claim 1, wherein a precompressed file comprises one of the following: a Microsoft Office Open XML file, an MP3 file, a JPG file, or a PDF file.

17. A system as in claim 1, wherein a precompressed file is compressed with one of the following: zip, gzip, PKZIP, bzip2, or lzip.

18. A system as in claim 1, wherein the processor is further configured to retrieve meta information associated with the precompressed file.

19. A system as in claim 18, wherein the meta information comprises one or more of the following: a list of segments associated with storing the decompressed file, one or more segments associated with storing the difference file, a compression algorithm, a compression type, a compression parameter, and a file name.

20. A method for storing precompressed files, comprising:
retrieving, using a processor, a precompressed file stored as a set of segments and a difference file, wherein the difference file comprises one or more differences between the precompressed file and a recompressed input file obtained by compressing a decompressed version of the precompressed file, wherein a set of precompression compression parameters is different from a set of recompression compression parameters, wherein the precompressed file stored as the set of segments is stored using the decompressed version of the precompressed file;
reconstructing the precompressed file stored as the set of segments;
recompressing the reconstructed file into a current recompressed file;
undo the one or more differences in the current recompressed file as indicated by the difference file.

21. A computer program product for storing precompressed files, the computer program product being embedded in a non-transitory computer readable storage medium and comprising computer instructions for:
retrieving, using a processor, a precompressed file stored as a set of segments and a difference file, wherein the difference file comprises one or more differences between the precompressed file and a recompressed input file obtained by compressing a decompressed version of the precompressed file, wherein a set of precompression compression parameters is different from a set of recompression compression parameters, wherein the precompressed file stored as the set of segments is stored using the decompressed version of the precompressed file;

reconstructing the precompressed file stored as the set of segments;

recompressing the reconstructed file into a current recompressed file;

undo the one or more differences in the current recompressed file as indicated by the difference file.

* * * * *